Sept. 3, 1963    A. DRESDEN    3,102,710
VALVE HAVING ELASTOMER SLEEVE
Filed July 24, 1959    2 Sheets-Sheet 1
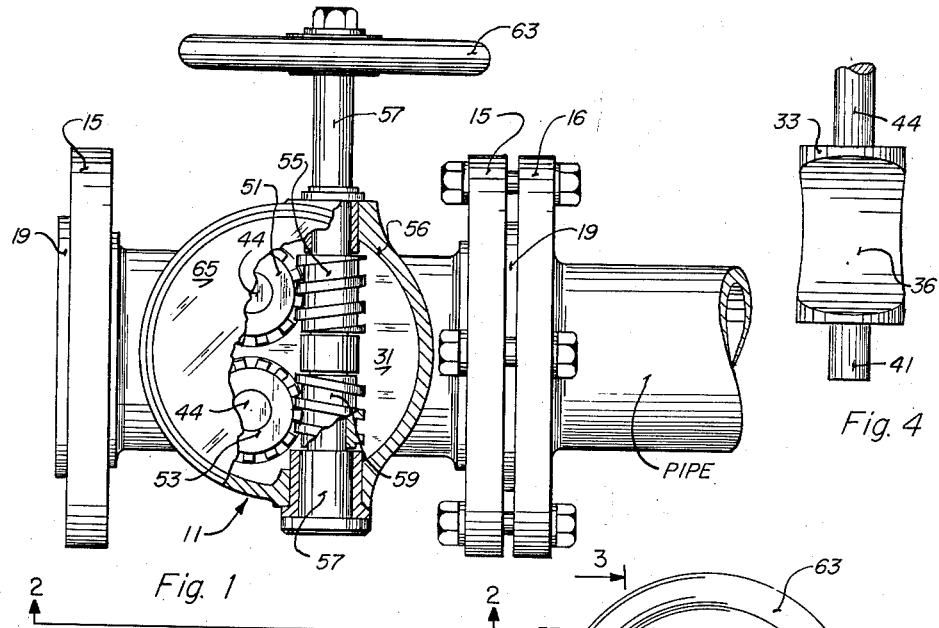
Fig. 1
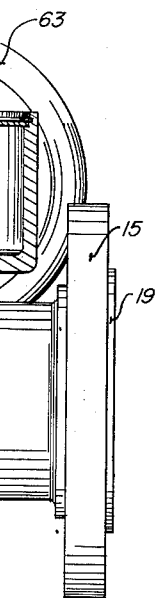
Fig. 4
Fig. 2
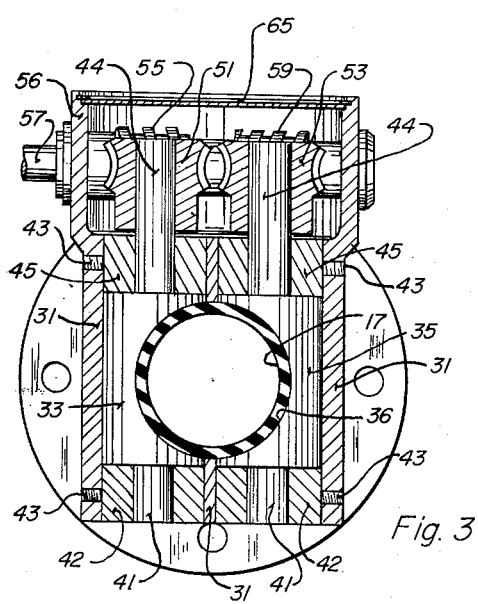
Fig. 3
INVENTOR.
Anton Dresden
BY
Buckhorn, Cheatham, & Blore
ATTORNEYS Sept. 3, 1963     A. DRESDEN     3,102,710
VALVE HAVING ELASTOMER SLEEVE Filed July 24, 1959     2 Sheets-Sheet 2

INVENTOR.
Anton Dresden
BY
Buckhorn, Cheatham, & Blore
ATTORNEYS

United States Patent Office 3,102,710
Patented Sept. 3, 1963

3,102,710
VALVE HAVING ELASTOMER SLEEVE
Anton Dresden, 2430 SW. Summit Court,
Lake Grove, Oreg.
Filed July 24, 1959, Ser. No. 829,293
12 Claims. (Cl. 251—9)

This invention relates to valves and particularly to valves of the type having an elastomer sleeve that is compressed to regulate the flow of fluid through the valve.

Prior valves of this general type have been defective in that high pressures or even medium pressures could not be properly controlled. That is to say, in a valve of prior construction the pressure is effective against an unsupported area of the elastomer sleeve thus limiting the pressure which can be contained to that which the unsupported elastomer can support.

To be more specific, prior valves have not been able to be used in connection with high or medium pressures, because the sleeve material has not been strong enough to resist the high or medium pressures to which it is subjected.

The main object of the present invention is to provide a valve of the type under consideration in which the elastomer sleeve is fully supported at the high pressure side thereof in the closed and in the open position of the valve.

Another main object of the present invention is to provide a valve of the type under consideration in which the elastomer sleeve is fully supported in any position from the fully closed to the fully open position of the valve.

Another important object of the invention is to provide a valve of this general type in which in the open position there is no more impedance to flow than at the inlet or outlet of the valve or than in a straight pipe of the diameter of the pipe line in which the valve is used.

Another important object of the invention is to provide a simple and inexpensive valve of the elastomer sleeve type equipped with a novel mechanism for pinching the sleeve closed.

A more particular object of the invention is to provide a valve as just mentioned in which the valve elastomer sleeve is closed by the operation of a pair of counter-rotating valve members.

A more specific object of the invention is to provide a valve of the type under consideration having a pair of generally cylindrical members having cutout portions to accommodate the sleeve in the open position of the valve, the members being rotatable to bring other portions thereof into engagement with the sleeve to press the same closed.

A still further object of the invention is to provide a valve having an elastomer sleeve in which there is means for pinching the sleeve together from a circular configuration to a parallel wall configuration through successive configurations approaching those of circles with ever decreasing diameters.

A further object of the invention is to provide a valve having an elastomer sleeve having a configuration which assures that no objectionable puckering occurs in any position of closure.

A further object of the invention is to provide an elastomer sleeve having a configuration which presents on the downstream side an approximation of a venturi in any position of closure.

Another object of the invention is to provide a valve of the type under consideration which can handle fluids with solids in suspension.

Further objects of the invention will be apparent from the following description taken in connection with the accompanying drawings wherein:

FIG. 1 is a top view of a valve embodying the concepts of the present invention, parts being broken away for convenience in illustration;

FIG. 2 is a side view of the valve with parts broken away for convenience of illustration, the view being taken in the direction of the arrows 2—2 in FIG. 1;

FIG. 3 is a vertical section taken along line 3—3 of FIG. 2;

FIG. 4 is a view of the recessed side of a sleeve operating member, the view being taken in a direction 90° from that shown in FIG. 3.

Figure 5:
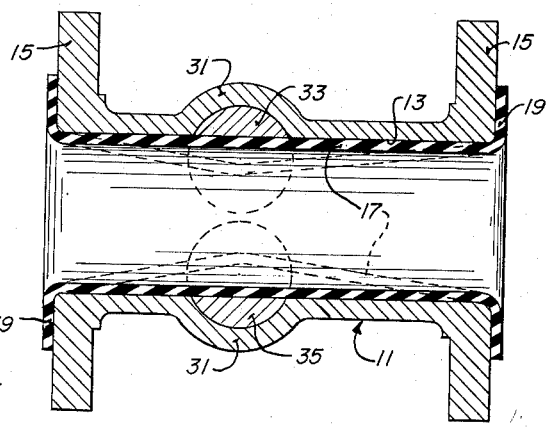
Figure 8:
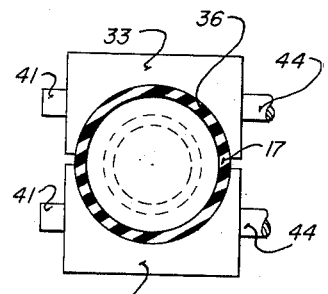
Figure 6:
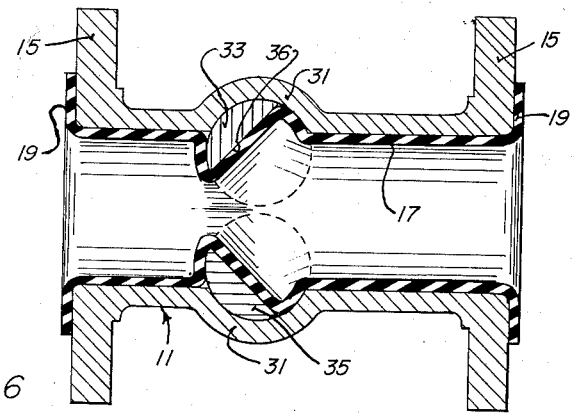
Figure 9:
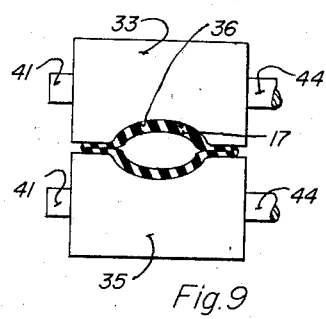
Figure 7:
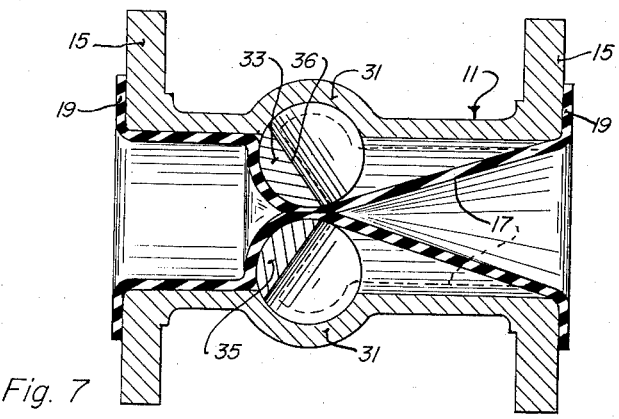
Figure 10:
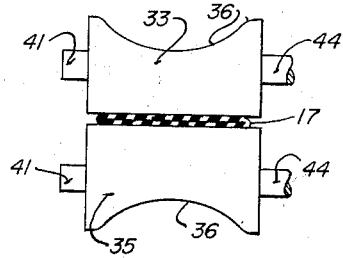

FIGS. 5, 6 and 7 are diagrammatic longitudinal sectional views showing various steps during closing of the valve; and FIGS. 8, 9 and 10 are transverse diagrammatic views corresponding to FIGS. 5, 6 and 7.

Referring to the drawings, and particularly to FIGS. 1 and 5, the valve includes a body generally indicated by the reference numeral 11 having a cylindrical bore 13 therethrough and flanges 15 at the opposite ends thereof for connection to the flanges of pipe, one numbered 16 being shown in FIG. 1. An elastomer sleeve has a tubular portion 17 of circular cross section extending through the bore 13. The term "bore" is not meant to imply that the opening through the body is formed by a boring operation, but is merely used for convenience in describing the opening.

The sleeve has flanges 19 at the opposite ends thereof fitting against the flanges 15 of the valve body, and between such flanges and the flanges of pipe as shown for one sleeve flange in FIG. 1. For convenience, hereinafter the sleeve will be referred to by the reference numeral 17.

The portion of the sleeve within the bore 13 has a double frusto-conical configuration in its normal or undistorted shape as is apparent from the dotted lines in FIG. 5. However, the pressure of the fluid being handled will expand the sleeve to the full line position shown in FIG. 1. The reason for this special shape of the sleeve will be apparent hereinafter.

Intermediate its length, the valve body 11 has an enlarged chest portion 31 as shown in FIGS. 2 and 3, providing a pair of spaced parallel vertical cylindrical bores accommodating a pair of sleeve pinching members or plugs 33 and 35. Each member has a cylindrical central portion fitting within the walls of the associated bore and recessed at 36 to accommodate the sleeve 17. The portions of the members defining the recesses may be considered as bridging portions. Each of the sleeve pinching members 33 and 35 has a short lower shaft 41 journaled in a plug 42 fitting and held within the lower end of the associated bore by a screw 43. Each member also has an upper shaft 44 journaled in a plug 45 which is similarly held by a screw 43. The bores and members are so dimensioned and located that when the cylindrical portions of the members are turned so as to be next to one another, as shown in FIG. 7, the cylindrical portions will be separated by a distance slightly less than the double thickness of the wall of the sleeve 17. This means that the members will pinch but not crush the walls of the elastomer sleeve disposed between such cylindrical portions.

Worm gears 51 and 53 are fixed to the upper shafts 44 of member 33 and 35 respectively, and are contained within a housing 56 forming an integral continuation of chest portion 31. Worm gear 51 meshes with a worm portion 55 as shown in FIG. 1, on a worm shaft 57 and gear 53 meshes with a worm portion 59 on the shaft 57. These worm portions and their mating worm wheels are right and left hand respectively so that the members 33 and 35 rotate in opposite directions upon rotation of the shaft 57. The shaft 57 is journaled in the walls of the housing 56 and projects from the housing and has a hand wheel 63 fixed to its outer end. A cover 65 closes the housing 56.

Operation

Now referring to FIGS. 5 through 7 and 8 through 10, FIGS. 5 and 8 show the sleeve pinching members in their open positions. In order to close the valve, the hand wheel 63 is rotated to turn the members to intermediate positions, as shown in FIGS. 6 and 9, in which the members partially pinch and compress the sleeve 17 so that the flow of fluid is reduced. FIG. 7 shows the members rotated approximately 135° from the FIG. 5 positions so that the cylindrical portions of the members are close together and tightly pinch the sleeve to completely close the valve. It is apparent that when the sleeve 17 is squeezed from a circular position to a parallel wall condition, its width is not allowed to change so that there would be excess material and puckering if the original sleeve in its relaxed position were not tapered as shown in FIG. 1. However, the sleeve is designed so that its circumference at the place it is pinched together is equal to twice the diameter of the expanded sleeve. Therefore, there is no excess material, no puckering and thus no temporary "extruding" of wall material in an axial direction when the sleeve is closed. This "extrusion" can be considered as objectionable pinching in contrast to the pinching or pressing operation occurring during closure of the sleeve. The latter operation merely presses the sleeve walls together.

A sleeve having a cylindrical portion instead of a tapered portion can be used, and a tight seal will result. However, "temporary extrusion" will occur when the sleeve is closed. This will damage the sleeve over a considerable period of operation, but if frequent closing of the valve is not contemplated, the sleeve can be cylindrical.

In FIG. 7 the dotted lines show the general position the downstream portions of the sleeve take when there is back pressure, while the full lines show the position in case of no back pressure.

A quantity of lubricant preferably is inserted between the sleeve and the walls of the bore 13. This lubricant will form a film on the sleeve pinching members, the bore walls and the exterior walls of the portion of the sleeve extending through the bore. The lubricant will be retained within the valve because the flanges 19 will be pressed tightly against the body flanges 15 to prevent escape at such places and suitable O-ring seals, or equivalent seals, may be provided around the shafts 41 and 44 and on the exterior of the plugs 42 and 45 to prevent escape at these places. The lubricant will thus be of a permanent nature.

In describing my invention, it has been necessary to show the invention embodied in a particular valve, but it is apparent that the concepts of the invention can be incorporated in many valves.

A very important feature of the present invention is the fact that in any position of the valve all portions of the sleeve are fully supported by either the interior walls of the valve body or by the cylindrical portions of the members, so that the valve may be used to control fluid under a much higher pressure than the sleeve alone could resist. However, the invention is not intended to be restricted to high pressure valves since the valve may be also utilized for controlling low pressure fluids such as gas. Also, it can be utilized for mud, papermill stock and other fluids with solids in suspension.

It is pointed out that a venturi effect is obtained in all positions of closure of the sleeve because the opening in the sleeve is generally ovate in all positions. Thus, the fluid passing through this opening will not tend to cavitate and become turbulent.

Having described the invention in what is considered to be a preferred embodiment thereof, it is desired that it be understood that the invention is not to be limited other than by the following claims.

I claim:
1. A valve comprising a body having a cylindrical bore, an elastomer sleeve within said bore having an intermediate portion spaced from the wall of said bore and opposite end portions engaging said wall in the preformed condition of said sleeve, said intermediate portion being expansible an extent under fluid pressure to contact said bore to provide a sleeve of uniform diameter under fluid pressure conditions, and means at said intermediate portion to press the walls of the sleeve together.

2. A valve comprising a body providing a bore, an elastomer sleeve in said bore, a pair of sleeve pinching members positioned one on either side of the sleeve and rotatable about parallel axes extending transversely of the axis of said sleeve, said members having concave surfaces next to said sleeve to accommodate said sleeve, and means for turning said members to force inwardly the walls of said sleeve, each member projecting radially from its axis of rotation a distance not exceeding the distance of said axis from the axis of said sleeve.

3. A valve comprising a valve body having wall portions defining a bore, a pair of parallel cylindrical plugs arranged transversely of said bore and symmetrically on the opposite sides of the center line of said bore, said wall portions having openings formed therein to accommodate said plugs, said plugs having concave recesses the walls of which constitute a continuation of the wall portions of said bore, an elastomer sleeve extending through said bore, and means for rotating said plugs in unison to bring the portions of said plugs that bridge said recesses from remote positions to adjacent positions to press the wall of said sleeve inwardly.

4. A valve comprising a valve body having a wall defining a bore, a pair of parallel cylindrical plugs arranged transversely of said bore and symmetrically on the opposite sides of the center line of said bore, said wall having recesses formed therein to accommodate said plugs, said plugs having concave recesses the walls of which constitute a continuation of the wall of said bore, an elastomer sleeve extending through said bore, and means for rotating said plugs in unison to bring the portions of said plugs that bridge said plug recesses from remote positions to adjacent positions to press the wall of said sleeve inwardly, said bridging portions when in said adjacent positions being spaced apart a distance less than twice the wall thickness of said sleeve so that opposed wall portions of said sleeve may be compressed together.

5. A valve comprising a valve body having a wall defining a through bore and also a pair of transverse cylindrical bores that intersect said through bore on opposite sides of the center line of said through bore and symmetrically with respect thereto, said cylindrical bores being spaced from one another, a pair of cylindrical sleeve closing members occupying said cylindrical bores and having cylindrically curved recesses providing concave walls which define continuations of the wall of said through bore in certain positions of said members, an elastomer sleeve extending through said through bore, and means for rotating said members simultaneously in opposite directions to press the wall portions of said sleeve inwardly.

6. A valve as set forth in claim 5 in which the space between said cylindrical bores is less than twice the wall thickness of said sleeve.

7. A valve comprising a valve body having a flow passageway and also a pair of transverse cylindrical bores that intersect said passageway on opposite sides of the center line of said passageway and symmetrically with respect thereto, said cylindrical bores being spaced from one another, a pair of cylindrical sleeve closing members occupying said cylindrical bores and having cylindrically curved recesses providing concave walls which define continuations of the wall of said passageway in certain positions of said members, an elastomer sleeve extending through said passageway, and means for rotating said members simultaneously in opposite directions to move the portions of said members that bridge said recesses inwardly to press the wall of said sleeve inwardly, the space between said cylindrical bores being less than twice the wall thickness of said sleeve, the minimum width of the bridging portions being greater than one-half the diameter of said passageway at the location of said members so that the edges of said bridging portions that press the sleeve wall inwardly can be moved to positions to press opposed sleeve wall portions fully together and yet maintain the other edges of said bridging portions in contact with the walls of said cylindrical bores so that the elastomer sleeve is completely supported at all times.

8. A valve comprising a body having a flow passageway, an elastomer sleeve within said passageway having a preformed condition in which the wall of said sleeve tapers inwardly in two directions to an intermediate portion having an outer diameter less than that of the portion of the passageway at the location of said intermediate sleeve portion, said intermediate sleeve portion expanding under fluid pressure to conform to said passageway, a pair of rotary sleeve pinching members located at said intermediate portion and recessed to accommodate the sleeve in its expanded condition, and means for rotating said members to close the sleeve.

9. A valve comprising an elastomer tubular flow member, a pair of cylindrical valve members mounted on opposite sides of said flow member in symmetrical relation to said flow member and in transverse relation to said flow member, the diameter of each cylindrical member being less than that of said flow member and the axes of said cylindrical members being spaced apart a distance less than the diameter of said flow member, said cylindrical members having concavities accommodating said sleeve and leaving bridging portions of said cylindrical members, means for rotating said cylindrical members from positions where said concavities face said flow member to positions with said concavities facing generally away from said flow member to bring said bridging portions into adjacent relationship, the distance between the axes of said cylindrical members being greater than the combined radiuses of said cylindrical members by an amount less than twice the wall thickness of said flow member.

10. A valve comprising an elastomer sleeve of circular interior cross section, and means for pinchingly engaging the exterior of said sleeve at two diametrically opposite points only, which points are located equal distances from central opposed wall portions of said sleeve, said means being operable to pinch together at each point the immediately adjacent wall portions of said sleeve while leaving said central opposed wall portions of said sleeve still substantially spaced apart, said means being operable to progressively increase the pinching operation until said sleeve is entirely closed.

11. A valve comprising an elastomer sleeve of circular interior cross section, and means for pinchingly engaging the exterior of said sleeve at two diametrically opposite points only, which points are located equal distances from central opposed wall portions of said sleeve, said means being operable to pinch together at each point the immediately adjacent wall portions of said sleeve while leaving said central opposed wall portions of said sleeve still substantially spaced apart, said means being operable to progressively increase the pinching operation until said sleeve is entirely closed, said means including a pair of rotary members having concave walls next to the sleeve on opposite sides thereof and rotatable to effect center closing of the sleeve.

12. A valve comprising an elastomer sleeve of circular cross section, a pair of parallel cylindrical members positioned transversely one on either side of said sleeve and having cylindrically curved recesses concentric with the axis of said sleeve to accommodate said sleeve and mounted for rotation about the geometric axes of said members to press opposed sleeve wall portions inwardly.

References Cited in the file of this patent

UNITED STATES PATENTS

| 1,108,128 | Buffum | Aug. 25, 1914 |
| 1,264,479 | Barth | Apr. 30, 1918 |
| 1,683,322 | Annis | Sept. 4, 1928 |
| 2,112,592 | MacClatchie | Mar. 29, 1938 |
| 2,371,434 | Eppler | Mar. 13, 1945 |
| 2,516,029 | Swindin | July 18, 1950 |
| 2,641,087 | Greiser | June 9, 1953 |
| 2,748,666 | Forrest | June 5, 1956 |
| 2,844,351 | Smith | July 22, 1958 |

FOREIGN PATENTS

| 13,127 | Great Britain | of 1890 |
| 53,810 | German | of 1890 |
| 973,168 | France | of 1951 |
| 734,885 | Great Britain | of 1955 |
| 803,144 | Great Britain | of 1958 |

OTHER REFERENCES

German application F 12,854, printed July 5, 1956 (Kl. 64c 34).